June 19, 1956     B. BARÉNYI     2,751,247
PASSENGER CAR FRAME STRUCTURE
Filed Jan. 25, 1952     2 Sheets-Sheet 1
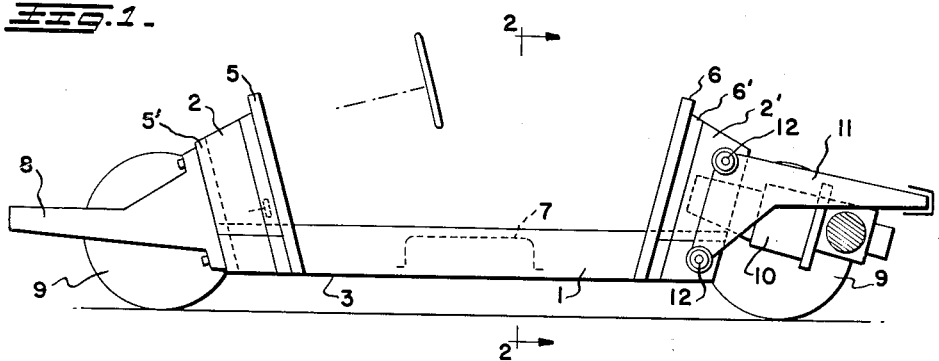
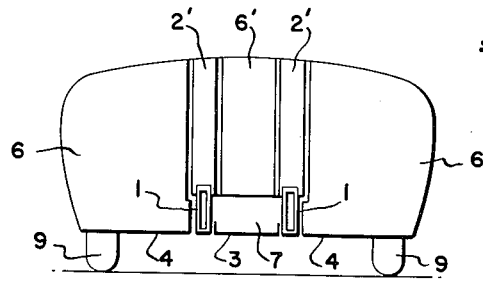
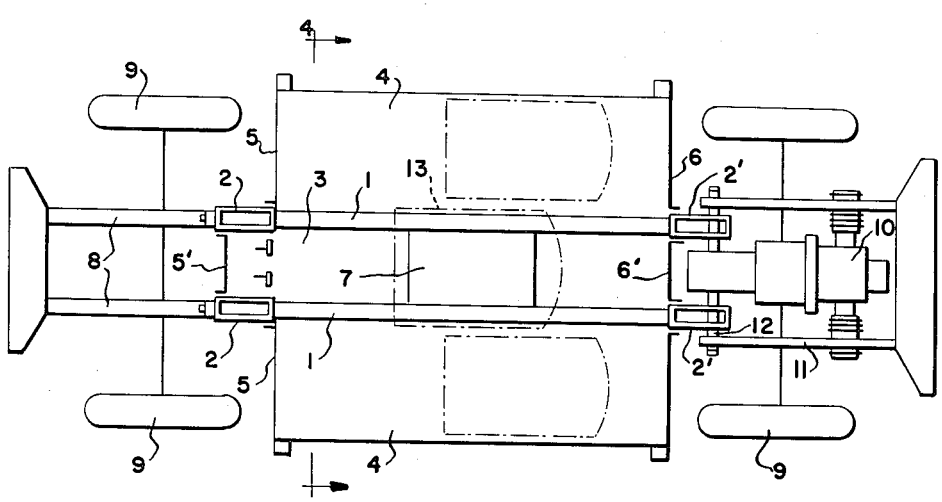
INVENTOR
BELA BARENYI
BY Dicke and Padlon
ATTORNEYS June 19, 1956  B. BARÉNYI  2,751,247
PASSENGER CAR FRAME STRUCTURE
Filed Jan. 25, 1952  2 Sheets-Sheet 2
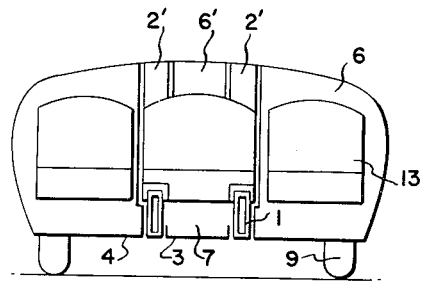
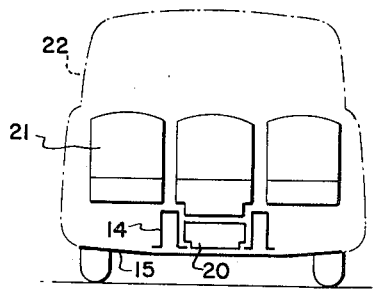
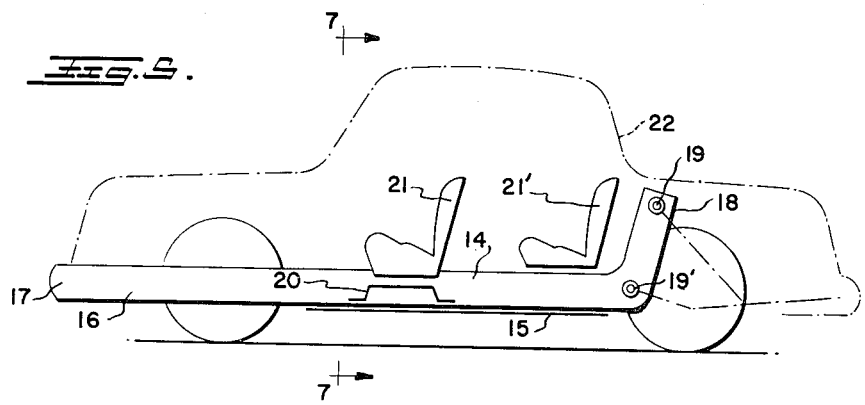
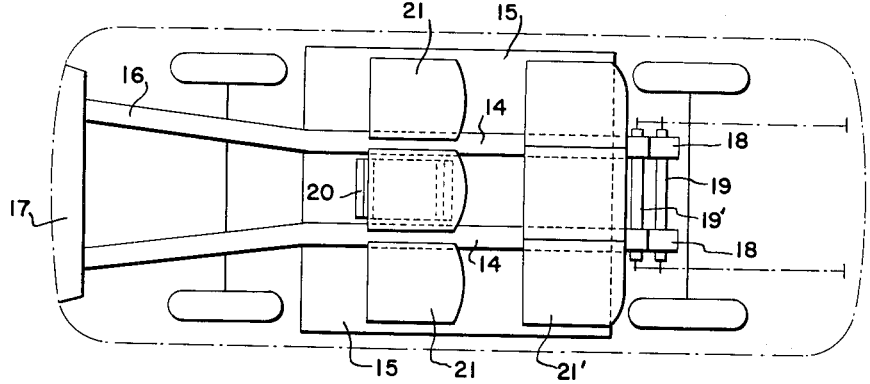
INVENTOR
BELA BARENYI
BY Dicke and Padlon
ATTORNEYS United States Patent Office 2,751,247
Patented June 19, 1956

2,751,247
PASSENGER CAR FRAME STRUCTURE

Béla Barényi, Stuttgart-Rohr, Germany, assignor to Daimler-Benz Aktiengesellschaft, Stuttgart-Unterturkheim, Germany Application January 25, 1952, Serial No. 268,277

Claims priority, application Germany January 30, 1951

4 Claims. (Cl. 296—28)

The present invention relates to passenger car frame structures comprising two longitudinally extending side members which are connected to one another by a bottom plate structure forming the floor of the passenger compartment.

Accordingly, it is an object of the present invention to provide a passenger car having a frame structure of simple design and relatively great rigidity which frame structure permits a very low overall height of the passenger compartment and also permits a favourable utilization of the space available within the passenger compartment.

Several embodiments of the invention will be described below with reference to the accompanying drawings of which Fig. 1 is a schematic longitudinal sectional view of a passenger car, Fig. 2 is a schematic cross sectional view on line 2—2 of Fig. 1.

Fig. 3 is a schematic plan view of the same car illustrated in Figure 2,

Figure 4 is a cross-sectional view taken along line 4—4 of Figure 3,

Figure 5 is a schematic longitudinal view of another embodiment of a passenger car in accordance with the present invention, Figure 6 is a plan view of the car illustrated in Figure 5, and Figure 7 is a cross-sectional view taken along line 7—7 of Figure 5.

In the embodiment shown in Figures 1 to 4, in which the front and rear frame structures are the same except that the right or rear end thereof includes a subframe for the vehicle drive while the front or left end thereof includes a subframe for supporting the front wheel suspensions, the two symmetrically arranged frame side members of box shaped cross section are designated by the reference numeral 1. The front and rear end portions 2 and 2′ respectively of the side members 1 are bent upwardly. A center plate 3 and two side plates 4 form a bottom plate structure and are rigidly attached to the bottom or lowermost portions of the side members 1, the middle plate 3 being disposed between the side members 1 and the two side plates 4 being attached to the outer sides of the lowermost portions of the side members 1 and adjoining the same towards the outside thereof. The front portions 5′ and 5 and the rear portions 6′ and 6 of the plates 3 and 4 are bent upwardly at the same angle as the side member end portions 2 and 2′ of the frame side members 1. A box shaped reinforcing structure 7 is disposed between the middle sections of the side members 1. It can be seen from Fig. 3 that the front portion 5′ of the middle plate 3 is attached close to the outer edge of the side member end portions 2, so as to provide additional floor space in front of the driver seated on the middle seat 13. Compared to the front portion 5′ of the middle plate 3 the front portions 5 of the side plates 4 are bent upwardly at a point located further towards the rear of the car so as to provide sufficient turning clearance for the front wheels 9. Frame extensions 8 are bolted to the upwardly extending front end portions 2 of the side members, the extensions 8 serving as support for the front wheel suspension system and for the steering gear assembly (not shown). At the rear of the car both plate end portions 6′ and 6 are fastened to the inner or forward edges of the upwardly extending side member end portions 2′. A sub frame 11 supporting the engine 10 and the power train assemblies is linked to the end portions 2′ of side members 1 by means of cross members 12.

In the embodiment illustrated in the Figs. 5 to 7 the parallel extending center sections 14 of the side members are rigidly fastened—for instance by welding—on top of an integral plate structure 15. The forwardly extending end portions 16 of the side members diverge laterally and are connected at their outer ends by a cross member 17 which also serves as a bumper. The rear end portions 18 of the side members 14 extend upwardly and are reinforced at their ends by cross members 19 and 19′. A box shaped reinforcing structure 20 is disposed between the parallel center sections 14 below the middle seat in the front row of seats 21. Two rows of seats 21 and 21′ are provided in this embodiment. The middle seats may be supported on the side members in such a way that their bottom portions extend into the space between the two side members, as indicated in Fig. 7. The outline of the car body is designated by the dot-dash line 22.

From the foregoing, it will be noted that according to the invention a frame structure of the aforementioned general type is attained in which the plate structure is fastened to the lowermost bottom portions of the two side members 1 or 14, which side members extend parallel to one another within the floor area of the passenger compartment, the distance between these two side members being substantially equal to the normal width of an individual seat accommodating one passenger and being preferably equal to approximately one third of the width of the passenger compartment.

The plate structure may be an integral plate, such as plate 15, or may be composed of a middle plate 3 and two side plates 4, the middle plate 3 being disposed between the bottom portions of the side members 1 and the two side plates 4 being attached to the outer sides of these bottom portions.

Preferably, the plate structure is of such width that three individual seats may be arranged thereon side by side, the middle seat being arranged in such a way above the two side members that the bottom portion of its seat cushion extends into the space between the two side members. Several rows of seats may be arranged in the passenger compartment.

The plate structure is rigidly attached in any suitable manner or welded to the side members which are preferably made of sheet metal structures of the box girder type. Reinforcing frame cross members may be provided between the side members, if so desired.

What I claim is:

1. In a passenger car provided with three individual seats adjacent one another with a predetermined spacing between any two adjacent seats, a frame structure comprising in combination two side members spaced from each other a distance approximately equal to the normal width of one of said individual seats and extending substantially parallel to each other in the region of the passenger compartment in the spacings provided between any two adjacent seats, in combination with plate means consisting of three plates and forming essentially the floor of said passenger compartment, the central plate lying between the lowermost parts of said side members and the two side plates being fastened to the outside of said lowermost parts and adjoining the same towards the outside thereof.

2. The combination according to claim 1, wherein at least the middle one of said seats extends with the lower edge of the upholstered portion thereof below the upper edge of said side members.

3. In a passenger car provided with three individual seats adjacent one another with a predetermined spacing between any two adjacent seats, a frame structure comprising in combination two side members spaced from each other a distance approximately equal to the normal width of one of said individual seats and extending substantially parallel to each other in the region of the passenger compartment in the spacings provided between any two adjacent seats, said side members extending substantially horizontally within an area defined in the longitudinal direction by the shortest distance between the front and rear tires of each side of the car with the portions of said side members projecting towards the front and rear of the car beyond said area being bent upwardly, in combination with plate means consisting of three plates forming essentially the floor of said passenger compartment and being bent upwardly correspondingly to said side members to form the lower portions of the front and rear walls of said passenger compartment, the middle one of said plates lying between the lowermost parts of said side members and the two side plates being fastened to the outside of said lowermost parts and adjoining the same towards the outside thereof.

4. Frame structure according to claim 3, wherein the upturned front portions of said middle and of said side plates are disposed offset relative to one another.

References Cited in the file of this patent

UNITED STATES PATENTS

| | | |
|---|---|---|
| 2,108,215 | Stief et al. | Feb. 15, 1938 |
| 2,216,670 | Klavik | Oct. 1, 1940 |
| 2,301,330 | Schafer | Nov. 10, 1942 |

FOREIGN PATENTS

| | | |
|---|---|---|
| 507,097 | Germany | Feb. 11, 1938 |